July 28, 1925.  
D. STEINER  
BRAKE ATTACHMENT FOR AUTOMOBILES  
Filed April 5, 1924  
1,547,241
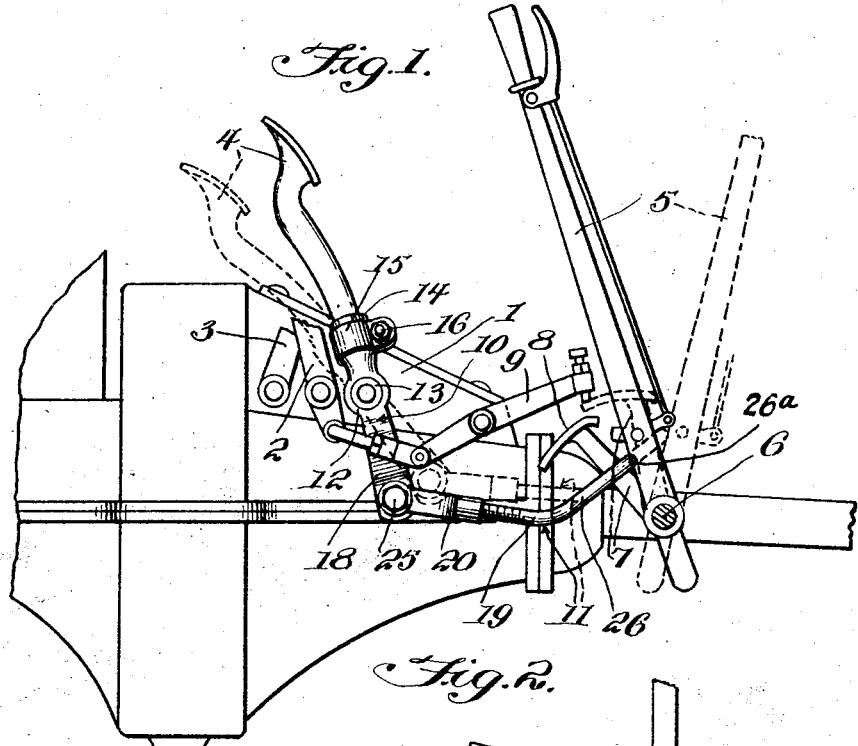
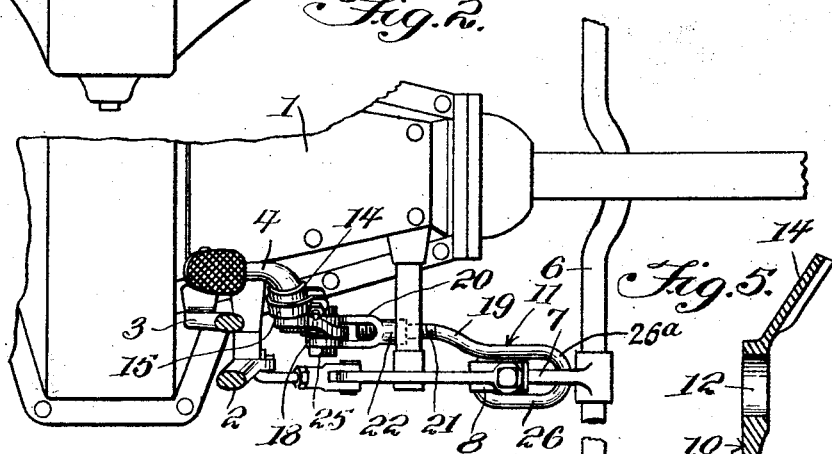
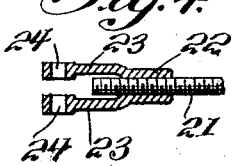
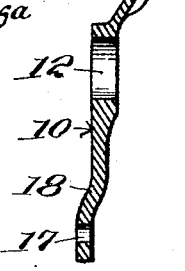
Inventor:  
Daniel Steiner,  
By A. C. Hines,  
Attorney.

Patented July 28, 1925.

1,547,241

UNITED STATES PATENT OFFICE.

DANIEL STEINER, OF OLYMPIA, WASHINGTON.

BRAKE ATTACHMENT FOR AUTOMOBILES.

Application filed April 5, 1924. Serial No. 704,418.

*To all whom it may concern:*

Be it known that I, DANIEL STEINER, a citizen of the United States, residing at Olympia, in the county of Thurston and State of Washington, have invented new and useful Improvements in Brake Attachments for Automobiles, of which the following is a specification.

This invention relates to a brake attachment for automobiles, and particularly to brake mechanism of the type used on Ford cars, the main object of the invention being to provide a novel connecting means between the foot brake pedal and emergency brake lever whereby when the emergency brake lever is operated the foot brake pedal will also be operated therewith, while at all other times the foot brake pedal may be operated independently of the emergency brake lever, thus allowing the service brake to be operated independently of the emergency brake while effecting a conjoint action of both the service brake and the emergency brake when the emergency brake lever is actuated.

Another object of the invention is to provide a connection of the character described which is simple of construction, reliable and efficient in operation, inexpensive of manufacture and installation, capable of being readily and conveniently applied, and when applied is not liable to get out of order or interfere in any manner with the ordinary operation of the control parts except for the specific purpose described.

The invention consists of the features of construction, combination and arrangement of parts, hereinafter fully described and claimed, reference being had to the accompanying drawing, in which:—

Figure 1 is a side elevation looking toward the speed and brake controls of a Ford automobile and showing the application of my invention thereto.

Figure 2 is a plan view of the same.

Figure 3 is a horizontal transverse section through the foot brake pedal, and the cuff of the crank member of my attachment applied thereto.

Figure 4 is a longitudinal section through the coupling of the link member of the attachment.

Figure 5 is a vertical section through the said crank member.

Referring now more particularly to the drawing, 1 designates generally the transmission housing of a Ford automobile, and 2 indicates the clutch pedal, 3 the reverse pedal, 4 the transmission brake pedal, and 5 the emergency brake lever, all of the ordinary and well known construction as used in the Ford type of car. The lever 5 is mounted in the customary manner on the transverse control shaft 6, which is provided with the upwardly and forwardly inclined cam carrying crank arm 7, the cam 8 of which is adapted for cooperation with the rocker arm 9 coupled to the clutch pedal 2 for speed controlling actions.

In carrying my invention into practice, I provide an operating connection between the foot brake pedal 4 and emergency hand brake lever 5 comprising a crank member 10 and a link member generally indicated at 11. The crank member 10 consists of a casting having an apertured portion 12 to receive the lower end 13 of the pedal 4, by which it is fitted thereon, and provided above said apertured portion with a cuff 14 of semi-elliptical form. This cuff projects laterally from the apertured portion 12 at an angle and bears against and embraces one side of the pedal 4 to which it is secured by a split clip or clamping member 15 the ends of which are united by a tightening and clamping bolt 16, whereby the crank member is fixed upon the pedal 4 for movement therewith. The lower end of the crank member 10 is in the form of an arm extending downwardly below the plane of the upper end of the crank arm 7 and terminating in an apertured lower end or eye 17, offset, as indicated at 18, outwardly beyond the plane of the arm of said crank member 10, so as to dispose the eye 17 beyond the adjacent side of the transmission casing 1 to permit of its connection with the link member 11 and to secure free and easy movement of these parts without interference.

The link member 11 is composed of two adjustably connected elements, to wit, a link rod 19 and a coupling yoke 20. The rod 20 has one end straight and threaded, as at 21, to engage a threaded eye 22 at one end of the yoke, the opposite end of which yoke is bifurcated to provide spaced yoke arms 23 receiving between them the eye 17 of the crank member 10, said yoke arms having terminal eyes 24 registering with the opening of the eye 17 and a bolt 25 being passed therethrough to pivotally connect the crank member 10 with the link member 11. The opposite end of the link element 19 is offset laterally in an outward direction in a plane beyond and parallel with the threaded end 21 and is bent upon itself to form an elongated loop 26, which loop receives and loosely engages the crank arm 7 on the shaft 6, through which a connection is provided whereby the pedal 4 and lever 5 are coupled together for brake applying motion in unison when the lever 5 is moved in a rearward direction. It will be observed that the forward end or portion of the link composed of the elements 21, 22, 23 and 24 extends downwardly and rearwardly from the arm 18 at an angle of inclination bringing it substantially into the horizontal plane of the shaft 6 at the point of connection of the part 21 with the forward end of the loop 26, which loop thence extends at a rearward and upward angle of inclination and embraces the crank arm 7 between its upper and lower ends, approximately midway between the crank shaft 6 and the cam 8 carried by the upper end of said crank arm, the sides of said link member slidably engaging the sides of said crank arm 7 and said link member being movable longitudinally in an inclined plane substantially at right angles to the normal plane of the arm 7. By this means the loop 20 is adapted to at all times slide freely on the crank arm 7, in the service brake applying motions of the pedal 4, without binding upon the arm 7 and without interference from said arm 7 or any of the parts of the emergency brake mechanism. The loop, as shown, is of elongated oval shape and its rear end or return portion provides a cross-bar 26ª which, in the normal position of the parts shown in Figure 1, rests lightly upon the rear edge of the arm 7, such cross-bar being adapted to be engaged by said arm when the lever 5 is moved rearwardly for an emergency brake applying action to transmit motion through the link connection to the pedal 4 for a simultaneous brake applying action.

The normal position of the pedal 4 and lever 5 is shown in full lines in Figure 1, that is, the positions which said pedal and lever occupy when the brakes actuated thereby are in off position. Figure 1 also shows in dotted lines the movements of the pedal 4 and lever 5 when shifted to brake applying positions. In the first-mentioned position of the parts, the cross-bar portion 26ª at the rear end of loop 26 of link member 11 engages and rests upon the upper edge of the crank 7, thus allowing said link to slide rearwardly from and return to such position without interference from the crank, so that the brake pedal 4 may be actuated in the usual way for the application and release of the transmission brake independently of the movements of any part of the emergency brake mechanism. In such position of the loop 26 it will be seen, however, that when the emergency brake lever 5 is moved rearwardly to the dotted line position the crank arm 8 will engage the cross-bar 26ª of the loop and transmit motion through the coupling connection to the foot brake pedal 4, whereby upon the operation of the emergency brake lever to apply the emergency brakes the foot brake pedal 4 will also be operated to apply the transmission or service brake. Thus the coupling connection permits of the usual independent motion of the brake pedal without operating the emergency brake, but on brake applying motion of the emergency brake lever the foot brake pedal will also be operated, so that both sets of brakes will be applied.

It frequently happens that in Ford cars the emergency brakes become worn or out of adjustment and hence are unreliable in action at a time when their use is desired and perhaps imperatively required. My invention provides a coupling connection which overcomes this objection in a simple, reliable and effective manner, as, even in the event of the insecure holding of the emergency brake, the transmission brake actuated therewith will operate to stop the vehicle. It will be seen that this result is gained by the application of a simple connection of the character described, which may be easily applied and maintained in working condition, and which is of a type not liable to get out of order and is so constructed and positioned that it will not interfere with the normal working operation of the parts except for the purpose described in the working motion of the emergency brake lever. The simplicity of the device adapts it not only to be manufactured and sold at a comparatively low cost, but also applied and maintained in efficient working order by the automobile owner or anyone having ordinary mechanical knowledge. The threaded connection between the link and yoke elements of the link member proper affords relative adjustment of said parts to conform to any variations in the relative arrangement of the pedal 4 and crank 7 which may exist in different machines, as well as to position the link member to secure a desired sensitiveness of operation.

It will be observed, also, that the elongated loop 26, in addition to allowing normal operation of the transmission brake without operating the emergency brake, forms a guide the sides of which are in sliding contact with the arm 7 in the transmission brake applying motions of the device, whereby the link member 11 is properly supported and guided in its motions and prevented from binding and interfering with the working motions of any of the brake operating parts.

Having thus fully described my invention, I claim:

In an automobile brake mechanism, a brake pedal, a brake actuating crank shaft, a crank arm carried by said shaft, a lever for rocking the shaft and extending normally at an upward and forward angle of inclination therefrom, a crank arm carried by the brake pedal and depending therefrom to a plane below the upper end of the first-named crank arm, and a link connection between said crank arms having a forward end portion pivoted to the crank arm on the brake pedal and extending rearwardly at a normal downward angle of inclination therefrom to a plane substantially coinciding with the plane of the crank shaft, and having a rear end portion extending at an upward and rearward angle therefrom, said rear end portion of said link connection comprising an elongated elliptical loop of materially greater length than the diameter of the crank arm carried by the shaft, said loop being arranged to embrace said crank arm and freely slidable with its sides in guided engagement therewith on a line at right angles to said crank arm and at a point approximately midway of the length thereof, said loop allowing free and independent movement of the brake pedal and link in the brake applying motion of said pedal, the outer end of the loop terminating in a cross bar engageable by the crank arm of the shaft on a rearward brake applying motion of said shaft to shift the brake pedal therewith only on such direction of motion of the shaft.

In testimony whereof I affix my signature.

DANIEL STEINER.